Oct. 23, 1962 N. D. ROBINSON 3,059,851

DIVIDING APPARATUS FOR DIGITAL COMPUTERS

Filed April 29, 1958 2 Sheets-Sheet 1

Inventor
N. D. Robinson
By [signature]
Attys

Inventor
N. D. Robinson
By Glascock Downing & Seebold
Attys 3,059,851
Patented Oct. 23, 1962

3,059,851

DIVIDING APPARATUS FOR DIGITAL COMPUTERS

Nigel David Robinson, Hillingdon, England, assignor to Electric & Musical Industries Limited, Hayes, England, a company of Great Britain Filed Apr. 29, 1958, Ser. No. 731,651
Claims priority, application Great Britain Apr. 30, 1957
4 Claims. (Cl. 235—165)

This invention relates to digital dividing apparatus and especially to apparatus for dividing binary coded numbers in digital computers.

In digital computers it is frequently necessary to perform division. This is especially necessary in output conversion where it may be desirable to convert a binary coded number into binary decimal form or binary sterling form. It is important moreover to ensure that the division process is carried out in a manner which wastes as little computing time as possible. Some previously proposed methods of division have the disadvantage that a number is operated on digit by digit and each digit operation occupies a minor cycle, so that a major cycle is required for the division. For a word of $n$ digits a major cycle is taken as a period of $2n$ minor cycles, a minor cycle period being that required to circulate the whole word once in, for example, a serial store. Clearly, the time required to provide an output conversion from binary to sterling or decimal forms can be prohibitive by known methods and the object of the present invention is to substantially reduce this disadvantage.

According to the present invention there is provided apparatus for dividing binary numbers comprising adding or subtracting means, means for feeding a binary dividend as one input to said adding or subtracting means, means for delaying the output from said subtracting means to an extent determined by the divisor, and means for feeding the delayed output as a second input to said adding or subtracting means, whereby the output of the adding or subtracting means is the required quotient.

In order that the invention may be clearly understood and readily carried into effect, the invention will be described with reference to the accompanying drawings, in which.

Figure 1:
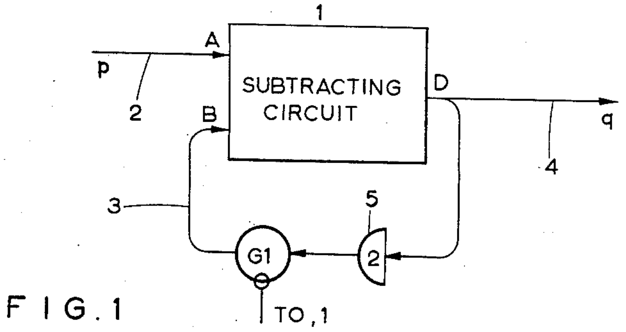
FIGURE 1 illustrates the principle of the present invention.

In order to explain the principle of the invention, suppose division of a binary coded number is required by a particular integral number 5. The operation may be symbolised as $$p=5q$$

where $p$ is the dividend and $q$ is the quotient, hence $$p-4q=q$$

which turns the process into a subtraction process. Since the system is a binary, the number to be subtracted, namely $4q$, must have zeros for its two least significant digits so that subtraction in these two digits can be performed with certainty to give the two least significant digits of $q$. By transferring the digits by two digit positions, subtraction in the next two positions can be performed and eventually $q$ is obtained. This is only true, however, if there is no remainder, for example when the dividend is an exact multiple of 5 such as in the following division of 55 by 5 in which the operations are commenced at the right hand end of the binary number 0110111

```
0110111÷101

       1011
    0110111(101
        101
     110010
       101
    010100
    0101
    ....
so that 0110111=101×1011
          55   =  5×11
```

If the dividend is not an exact multiple of 5 a remainder will be left at the left hand end of the result, the remainder being any number less than $4q$. Thus, dividing 87 (01010111) by 5 (101)

```
01010111÷101

        1011
   001010111(101
         101
       10010
        101
      100100
       101
     00100
so that 01010111=1011×101+00100000
        or 87=11   ×5   +32, which is correct
```

Alternatively taking another example, in the division of 17 by 5

```
0010001÷101

       1101
    0010001(101
        101
    0001100
       101
    11110
      101
    1010
so that 0010001=1101×101+1010000
        or 17=13  ×  5+(−48)
```

here, a "Complements code" has been assumed to produce the negative remainder (48). It is assumed here that 1010000=—0110000 which is clearly allowable neglecting all higher order digits.

Where the dividend is not an exact multiple of 5, the process thus tends to give only a partial quotient and a corresponding large remainder. However, the true quotient and remainder can be obtained in a second process by noting that the remainder produced initially has the same residue (mod 5) as the original dividend. Moreover, as there are only eight possible combinations for the three remainder digits, the residue (mod 5) can be obtained directly by conversion means included in the dividing apparatus. When the true remainder is thus obtained, it can be subtracted from the original dividend yielding a number in which an exact division by 5 can be performed to yield a true quotient as in Example 1 above. As will appear a division can be completed, even when there is a remainder, in two minor cycles.

It would also be feasible to obtain from the conversion means, not only the true remainder, but the partial quotient obtained when the initial large remainder is divided by 5. This partial quotient added to the partial quotient of the original division yields the true quotient.

The principle is applicable not only to division by 5 but to division by any number and especially to numbers which can be expressed as $$1+2^n$$

where $n$ is an integer, the division being represented by the equation $$p-2^nq=q$$

Thus the $n$ digits of lowest significance of $q$ can be obtained directly from the $n$ digits of lowest significance of $p$, since $2^nq$ always has zero for its $n$ digits of lowest significance. The next $n$ digits of $q$ can then be obtained by shifting the lowest digits of $q$ thus obtained $n$ places up and subtracting from the corresponding digits of $p$, and so on.

Before describing some practical forms of the invention with reference to the drawings, the symbols which have been used in FIGURES 1, 2 and 3 to simplify the drawings and facilitate description will be explained with reference to FIGURE 4.

FIGURE 4*a* represents a delay unit, a series of binary digital pulses applied to the input $p$ are delayed by one digit period before arriving at $q$. The number of digits delay is indicated by the number included in the block.

FIGURE 4*b* represents a non-equivalence gate. An input at $p$ causes an output at $r$ in the absence of an input at $q$ and an input at $q$ causes an output at $r$ in the absence of an input at $p$.

FIGURE 4*c* represents an inhibit gate, an input at $q$ preventing an input at $p$ being transmitted to the output $r$.

FIGURE 4*d* represents a coincidence gate which causes an output at $r$ only in response to simultaneous inputs at $p$ and $q$.

FIGURE 4*e* represents a two state device which assumes one of its states (state "1") in response to an input at $p$ and reverts to its other state (state "0") in response to an input at $q$.

Constructions of the elementary circuits represented in FIGURES 4*a* to 4*e* are well known to those skilled in the art.

Referring now to FIGURE 1 which shows the basic circuit required to divide by 5, block 1 represents a subtracting unit, which may be of any suitable known form, having a pair of inputs 2 and 3 and an output 4 which is coupled via a delay unit 5 and a gate G1 to the input 3. The delay unit 5 produces a delay of two digit periods and the gate is arranged to open two digit periods after the arrival of the first digit at 2 and closes immediately after the arrival of penultimate digit of the number comprising a dividend at 2. Considering the first simple example of division by five given above, with no remainder, since there is a delay of two digits the circuit of FIGURE 1 will perform $$0110111-0101100=01011$$

which appears as the quotient $q$ at the output of 1 and is the required result.

Division by 10 can be achieved using the principle described above by neglecting the digit of least significance of the dividend and dividing the remainder of the dividend by 5. The quotient produced will be the one required and the true remainder is obtained by placing the neglected digit of the dividend immediately to the right of the remainder produced by the division by 5:

$$\text{e.g. } 67\div10 \text{ i.e. } 01000011\div1010$$

Neglecting the last digit we find $$0100001\div101=0110 \text{ r. } 11$$

hence replacing the last digit $$01000011\div1010=0110 \text{ r. } 111$$
$$67\div10=6 \text{ r. } 7$$

Figure 2:
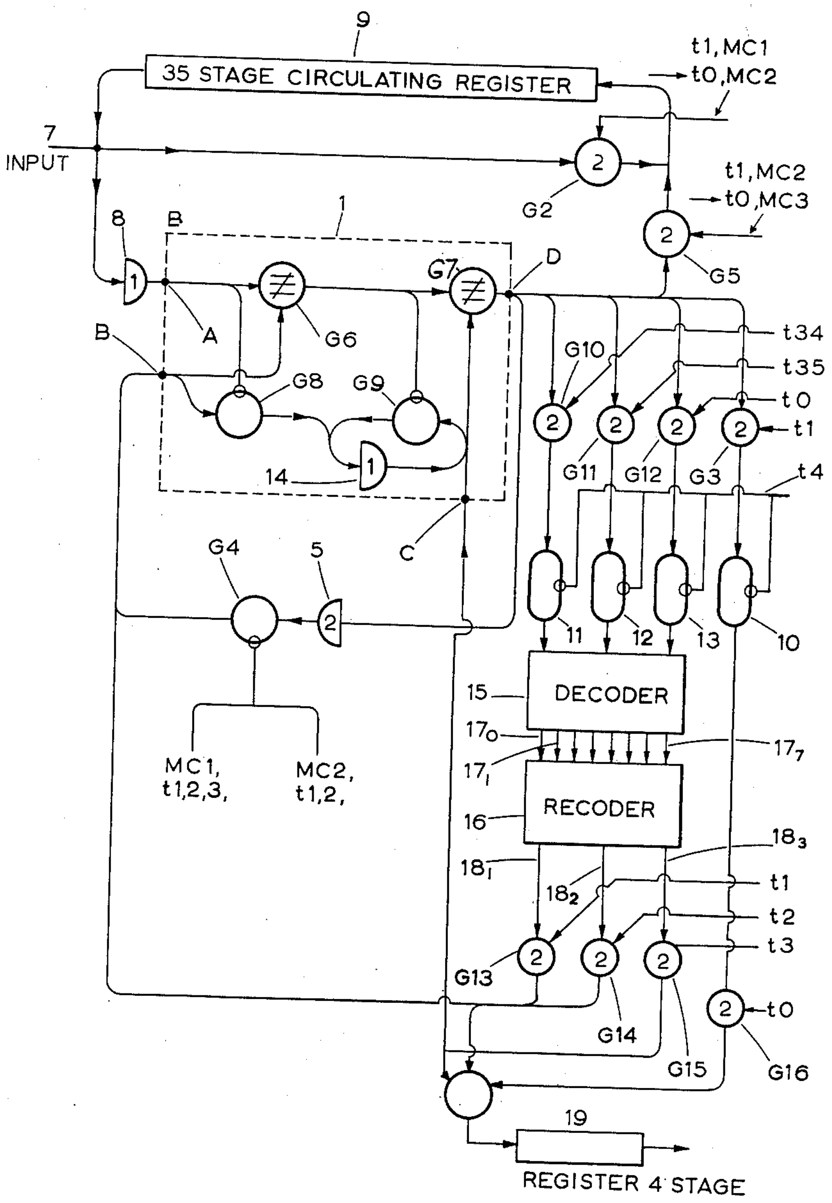
FIGURE 2 illustrates one form of apparatus according to the present invention for achieving division by 10.

The circuit about to be described with reference to FIGURE 2 is capable of dividing by 10. It operates in serial mode and the timing is controlled in well known manner by clock pulses which occur at digit rate. A division by 10 is completed in 2 minor cycles, each minor cycle, abbreviated to "MC" in the drawings, comprising 36 clock pulse periods. The clock pulses in any minor cycle may for convenience be identified as tick 0, tick 1, tick 2 and so on. The abbreviation "*t*" is used for "tick" in the drawings. The clock pulse generator is not shown as any stable pulse generator may be used. The circuit also requires for its operation trigger or gating pulses which start and end at predetermined ticks in each minor cycle. The generators of such pulses are, also, not shown since their construction is well known. For example, a pulse starting at one tick in one minor cycle and ending at another tick in the same or the next minor cycle may be generated by a 36 stage ring counter (denoted stages 0 to 35) and a two state device. A distinctive indication is shifted round the ring counter under control of the clock pulses. When it reaches one stage the ring counter generates a pulse which is applied to the two state device and changes it to a predetermined one of its states, say state "1". When the distinctive condition reaches another stage in the same or the next circulation, the ring counter generates another pulse, which when applied to the two state devices restores it to state "0."

The number to be divided is offered to the circuit at the input terminal as a thirty six digit serial number denoted by $P_0 \ldots P_{35}$ which has the significance $$-P_{35}2^{35}+\sum_{1=0}^{i=34}P_i2^i$$

in accordance with convention. The digits of the word are elementary signals which have different values to represent 1 and 0, but $P_{35}$ is always assumed to be zero. If $P_{35}$ is 1, the input number is converted to its complement, in which process $P_{35}$ is changed to zero, and the division takes place in the normal way about to be described, the fact that the quotient must be treated as negative being indicated in any convenient way. The incoming word is applied to a delay unit 8, having a delay time of 1 digit interval and to a gate G2, which when open applies the received digits to a circulating type of register 9 which has a capacity for 35 digits. The gate G2 is of threshold two, and as one input receives a gate pulse lasting from tick 1 in one minor cycle to tick 0 in the next (i.e. it ends with the beginning of tick 0), then during the first minor cycle all the digits of the applied number other than $P_0$ pass into the circulating register and fill it. On the other hand, digit $P_0$ delayed till tick 1 by the unit 8, is passed by the subtractor 1 and a gate G3 of the threshold two, to the two state device 10 which assumes one or other of states representing "0" or "1" according as $P_0$ represent "0" or "1." The gate G3 receives a pulse at tick 1 to condition the gate to pass $P_0$, but this digit takes no other part in the division and is in effect removed from the received number and stored to form part of the remainder, being the remainder which arises in dividing the received number by 2, whilst $P_1$ to $P_{35}$ is the quotient of that division. The main function of the circuit is to divide the number $P_1$ to $P_{35}$ by five.

Digit $P_0$ in passing through to the gate G3 passes through the subtracting circuit 1, by way of the one input terminal A, but as there is no other input at the time, it passes directly to the output. It tends to return at tick 3 to the second input B of the subtracting circuit via the delay element 5, but is stopped by the gate G4 which is inhibited at ticks 1, 2 and 3 of minor cycle 1. The remaining digits of the received number namely $P_1$ to $P_{35}$ also pass into the subtracting circuit via the terminal A, and each output digit of the subtracting circuit appearing at terminal D is returned, delayed in unit 5 by two digit intervals, to form the subtrahend. The subtracting circuit 1 is of a known construction and comprises two non-equivalence gates G6 and G7, two inhibitor gates G8 and G9 and a delay unit 14 the delay of which is one digit interval. In the subtracting circuit carry pulses are set up when there is an input at B and not at A, and these carry pulses are repeated by the recirculation loop including the gate G9 and the delay unit 14 until an output is produced from the non-equivalence gate G6. This can occur when there is an input at either A or B, but not both. An output pulse is produced either when there is an output from G6 or from the carry loop, but not both. By virtue of the delay circuit 5, the subtracting circuit forms the subtrahend $4q$, the result being a thirty-five digit word, of which the first thirty-two digits represent $q$, and the last three digits (including the sign digit) represent the remainder. Only the remainder is significant in the first minor cycle, the digits forming $q$ being suppressed since the gate G5 is closed at the relevant times. The three digits of the remainder are however passed in succession to three two state devices 11, 12 and 13 by gates G10, G11 and G12, which are conditioned by pulses at ticks 34 and 35 of minor cycle 1 and tick 0 of minor cycle 2 as indicated. It will be understood that the remainder digits arise at terminal D at these ticks because of the delay produced by the unit 8. The remainder staticised in 11, 12 and 13 at tick 1 of minor cycle 2 will have the value $$-q_{35}\times 2^{34}+q_{34}\times 2^{33}+q_{33}\times 2^{32}$$

where $q_i$ is the $i+1$th output binary digit of the subtractor.

Now $$2^{34}\equiv 4 \pmod 5$$

That is to say $2^{34}$ leaves a remainder of 4 when divided by 5

$$2^{33}\equiv 2 \pmod 5$$

$$2^{32}\equiv 1 \pmod 5$$

The remainder R which when subtracted from $P_1 \ldots P_{35}$ makes the difference exactly divisible by 5, is given by $$R\equiv -4q_{35}+2q_{34}+q_{33} \pmod 5$$

$$\equiv q_{35}+2q_{34}+q_{33} \pmod 5$$

since this number is congruent (mod 5) to the remainder staticised in 11, 12 and 13 at tick 1 of minor cycle 2. There are eight possible digit combinations for the remainder staticised in 11, 12 and 13 and to convert that remainder into the remainder R, there is provided a decoder 15 and a recoder 16. The decoder 15 is of the construction described in "High Speed Computing Devices," published by the McGraw-Hill Book Company, Inc., 1950, page 42, with reference to FIGURE 4–3*a*, and produces an output signal of given polarity on one or other of the output connections $17_0$ to $17_7$, depending on the particular combination of digits represented by the states of 11 to 13. The recoder 16 is arranged to derive the appropriate remainder R depending on which of the connections $17_0$ to $17_7$ carries the output signal from 15. The recoder is of the construction described in "High Speed Computing Devices," page 43, with reference to FIGURE 4–3*b*, and converts the input signal into a three digit binary number, representing R, the elementary digits of value "1" being represented by signals of predetermined polarity in the output connections $18_1$, $18_2$ and $18_3$. The interconnections between the decoder 15 and the recoder 16 are such that when $q_{33}$, $q_{34}$ and $q_{35}$ have the values indicated in the following conversion table, R has the corresponding values indicated (lowest digit on the right):

| $q_{35}$ | $q_{34}$ | $q_{33}$ | R |
|---|---|---|---|
| 0 | 0 | 0 | 000 |
| 0 | 0 | 1 | 001 |
| 0 | 1 | 0 | 010 |
| 0 | 1 | 1 | 011 |
| 1 | 0 | 0 | 001 |
| 1 | 0 | 1 | 010 |
| 1 | 1 | 0 | 011 |
| 1 | 1 | 1 | 100 |

During minor cycle 2, the number $P_1$ to $P_{35}$ is reapplied from the register 9 to terminal A of the subtracting circuit 1 and is again divided by 5. On this occasion however the remainder P is first subtracted from the number $P_1$ to $P_{35}$, leaving a number which is exactly divisible by 5. This is achieved by dynamicising the remainder R, by applying conditioning pulses to gates G13, G14 and G15 in the connections $\mathbf{18_1}$, $\mathbf{18_2}$ and $\mathbf{18_3}$ at ticks 1, 2 and 3 respectively of minor cycle 2, bearing in mind that although $P_1$ leaves 9 at tick 0 in minor cycle 2, it does not appear at A until tick 1, because of the delay unit 8. The first two digits of the remainder are applied directly to input terminal B of the subtracting circuit, since there is no other input at this terminal at ticks 1 and 2. The third digit of the remainder, if value "1" is however applied to an input terminal C of the subtracting circuit to be treated as an extra carry digit. This is necessary, because the arrival of the third remainder digit may coincide with the first output digit from D, delayed by the unit 5. In minor cycle 2, the gate G4 must be closed only at ticks 1 and 2.

During minor cycle 2 the number which appears at the output terminal D is the correct quotient for the division by five and is retained, being passed through the gate G5 to the register 9. For this purpose gate G5 is conditioned by a gate pulse from tick 1 of minor cycle 2 to tick 0 of the next minor cycle. The number finally stored in the register 9 is half the required quotient of the division by 10, the full quotient being of course obtained merely by shifting the quotient of the division by 5, one place to the left. The remainder of the division by 10 is obtained, for example, from a register 19, which receives the digits of R via the gates G13 to G15, preceded by the remainder of the initial division by 2, which is obtained from the two state device 10 via a gate G16 which receives a conditioning signal at tick 0. During micro cycle 2, no remainder is of course produced as a result of the division by 5.

If the 2 digit delay provided by the unit 5 in FIGURE 1 is replaced by a 1 digit delay and the gate G opened one digit earlier, a division by 3 may take place in a manner similar to the division by 5 so that taking account of an initial division by 2, division by 6 can be achieved. Appropriate modifications are of course required in the means for evaluating the true remainder.

Figure 3:
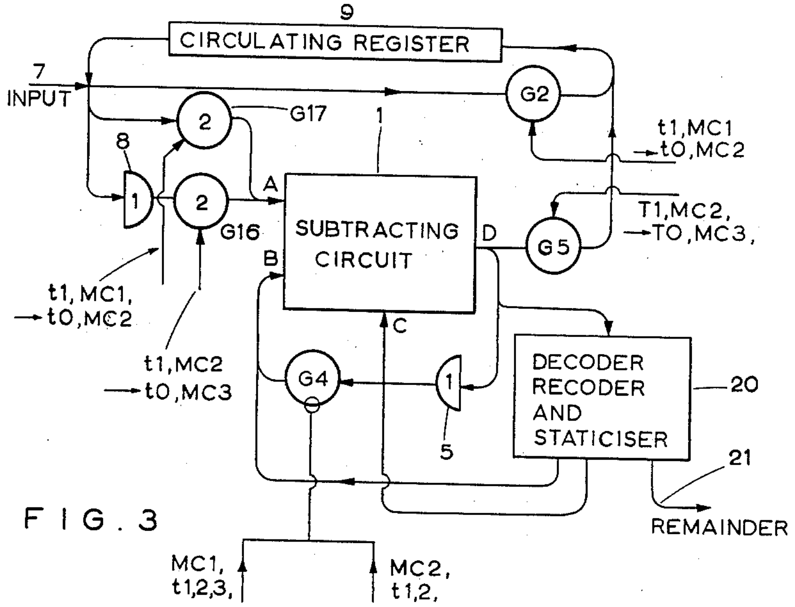
FIGURE 3 illustrates another form of apparatus according to the present invention for achieving division by 12.
Figure 4:
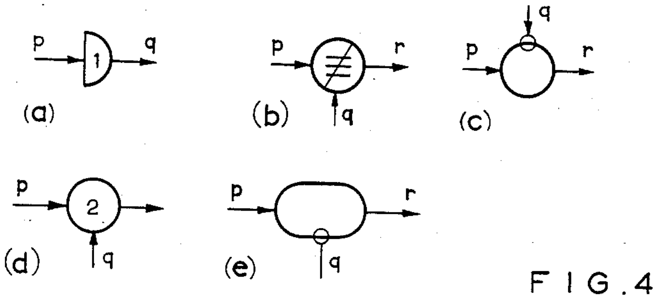
FIGURE 4 illustrates symbols used to denote some logical elements employed in FIGURES 1, 2 and 3.

FIGURE 3 shows apparatus similar to FIGURE 2 adapted to divide by 12. Assuming a 36 digit number, the register and subtracting circuit are the same as in FIGURE 2, but additional gates G16 and G17 are provided to enable the input number to be applied to A either via the delay unit 8, or by a path by-passing this delay unit. Gate G16 is open from tick 1 in minor cycle 1 to tick 0 in minor cycle 2, whilst G17 is open from tick 1 in minor cycle 2 to tick 0 in minor cycle 3. In the first minor cycle G16 accepts the offered number so that a right shift takes place. The gate G4 neglects the first 2 delayed digits and opens at tick 4 so that the number represented by the 34 most significant digits of the dividend is divided by 3. The two neglected digits are stored by two state devices similar to 10, to contribute to the final remainder. The remainder produced by the division by 3 staticised, decoded, recoded, redynamicised by means denoted in general by reference 20, similar to those described with reference to FIGURE 2 and fed to the subtracted from the dividend at the beginning of the second minor cycle. In this case the carry input C must be used for the second digit when the remainder is a 2 digit number. During the second minor cycle the gate G17 is switched to receive the number from the circulating register so that a second right shift is produced, resulting in an overall division by 12, during this second minor cycle the gate G4 being inhibited only at ticks 1 and 2. The two least significant digits of the dividend which are neglected by G1 in the first cycle and are staticised in 20 are placed to the right of the remainder formed by the division by 3 to produce the remainder corresponding to the division by 12, which is sent out along lead 21.

Since the first division by 3 is upon the number represented by the last 34 digits of the dividened, the required remainder R will be given by:

$$R \equiv -2^{33}q_{35}+2^{32}q_{34}+2^{31}q_{33} \pmod 3$$

Now $$2^{31} \equiv 2 \pmod 3$$
$$2^{32} \equiv 1 \pmod 3$$
$$2^{33} \equiv 2 \pmod 3$$

Therefore $R \equiv -2q_{35}+q_{34}+2q_{33} \pmod 3$
$\equiv q_{35}+q_{34}+2q_{33} \pmod 3$ This leads to the conversion table:

| $q_{35}$ | $q_{34}$ | $q_{33}$ | R |
|---|---|---|---|
| 0 | 0 | 0 | 000 |
| 0 | 0 | 1 | 010 |
| 0 | 1 | 0 | 001 |
| 0 | 1 | 1 | 000 |
| 1 | 0 | 0 | 001 |
| 1 | 0 | 1 | 000 |
| 1 | 1 | 0 | 010 |
| 1 | 1 | 1 | 001 |

and the decoder and recoder are interconnected accordingly. By taking last three digits from the subtracting circuit during the initial division as the remainder allows a circuit such as shown in FIGURE 2 to be switched readily for division by 3, or multiples of 3.

Although the present invention has been described with reference to two particular cases, namely division by ten and by twelve, the invention is clearly not limited to these and many other applications in standards conversion and the like may enjoy the advantages of the invention.

For example, it will be apparent that the invention can perform division not only by numbers which can be expressed as $$1+2^n$$

but also by numbers which can be expressed by $$2^m(1+2^n)$$

However the invention can also be applied to division by a number such as 7. In this case the division is expressed by the equation $$y-6x=x$$

and parallel delays of 1 and 2 digits respectively in the feedback path of the subtracting circuit are employed to deal with the term $6x$; a subtracting circuit with two subtrahend inputs being required.

Also division by negative number such as $1-2^n$ can be dealt with according to the principle of invention by using an additive process instead of a subtraction process. Such an addition process can be represented by the equation $$p+2^nq=q$$

What I claim is:

1. Apparatus for dividing binary coded numbers comprising a subtracting device having two input channels and an output channel, means for applying signals representing a dividend to a first of said input channels, a transmission channel connected from said output channel to a second of said input channels, said transmission channel including translating means for multiplying the significance of the signals from said output channel by a factor equal to one less than a divisor and means for applying said translated signals to said second input channel, an output register connected to said output channel to receive signals representing a quotient, means coupled to said output channel to derive from the signals thereof representing the highest order digits signals representing a remainder, decoding means responsive to said derived signals for producing further signals representing a remainder less than the divisor but congruent to the remainder represented by said derived signals with respect to a modulus equal to the divisor, means for applying said further signals to said second input channel and means for reapplying the signals representing the dividend to said first input channel.

2. Apparatus according to claim 1 comprising means for initially removing one or more of the lowest order digits of the dividend to represent division by a factor $2^m$, and means for adding the digits removed to any other remainder obtained to correct said remainder.

3. Apparatus for dividing serial binary coded numbers comprising a subtractive device having two input channels and an output channel, means for applying signals representing a dividend to a first of said input channels, a transmission channel connected from said output channel to a second of said input channels, said transmission channel including delaying means for multiplying the significance of the signals from said output channel by a factor equal to one less than a divisor, and means for applying said delayed signals to said second input channel, an output register connected to said output channel to receive signals representing a quotient in serial binary coded form, means coupled to said output channel to derive from the signals thereof representing the highest order digits signals representing a remainder, decoding means responsive to said derived signals for producing further signals representing a remainder less than the divisor but congruent to the remainder represented by said derived signals with respect to a modulus equal to the divisor, means for applying said further signals to said second input channel, and means for reapplying the signals representing the dividend to said first input channel.

4. Apparatus according to claim 3 comprising means for initially removing one or more of the lowest order digits of the dividend to represent division by a factor $2^m$, and means for adding the digits removed to any other remainder obtained to correct said remainder.

References Cited in the file of this patent

UNITED STATES PATENTS

| | | |
|---|---|---|
| 2,863,604 | LeClerc et al. | Dec. 9, 1958 |
| 3,018,047 | La Manna | Jan. 23, 1962 |

FOREIGN PATENTS

| | | |
|---|---|---|
| 780,431 | Great Britain | July 31, 1957 |